United States Patent [19]

Zürcher

[11] 3,999,428
[45] Dec. 28, 1976

[54] PROCESS AND APPARATUS FOR CONTINUOUSLY MEASURING THE VALUE OF THE TENSION IN A FILAMENT BEING DISPLACED FROM ONE POINT TO ANOTHER

[75] Inventor: Erwin Zürcher, Geneva, Switzerland

[73] Assignee: Battelle Memorial Institute, Carouge, Switzerland

[22] Filed: Oct. 28, 1975

[21] Appl. No.: 626,204

[30] Foreign Application Priority Data

Oct. 29, 1974 Switzerland .................... 14461/74

[52] U.S. Cl. .................................. 73/143; 73/37.7
[51] Int. Cl.² .......................................... G01L 5/08
[58] Field of Search .......... 73/144, 143, 160, 37.7; 242/75.43, 75.44

[56] References Cited
UNITED STATES PATENTS 3,845,434  10/1974  Carter ............................ 73/144 X
3,929,002  12/1975  Stern ............................... 73/160 X

*Primary Examiner*—Jerry W. Myracle

[57] ABSTRACT

A process and apparatus for continuously measuring the tension of a filament being displaced from one point to another comprising applying a lateral pressure to the filament to displace it from its trajectory and measuring of variations of the counter-pressure exerted by the filament. The pressure is exerted laterally by producing between the filament and a support a flow of gas whose values of flow rate and pressure are such as to form a gas film between the filament and the support. The filament rides on this gas film. Measurement is made of the variations of one of the values of flow rate and pressure with respect to the corresponding value in the absence of the filament. A direct read-out of filament tension can be made.

9 Claims, 7 Drawing Figures

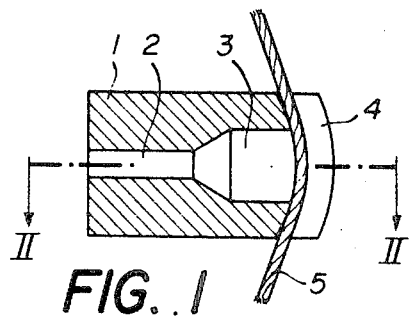
FIG. 1
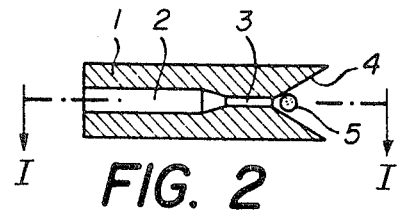
FIG. 2
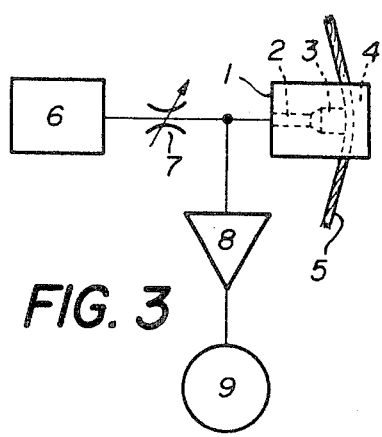
FIG. 3
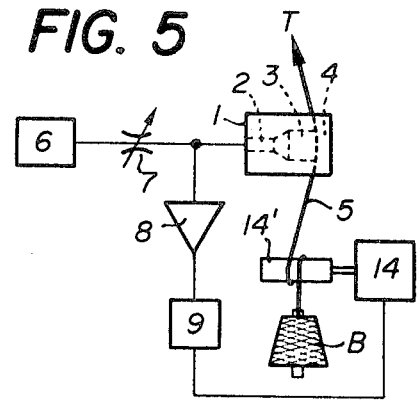
FIG. 5
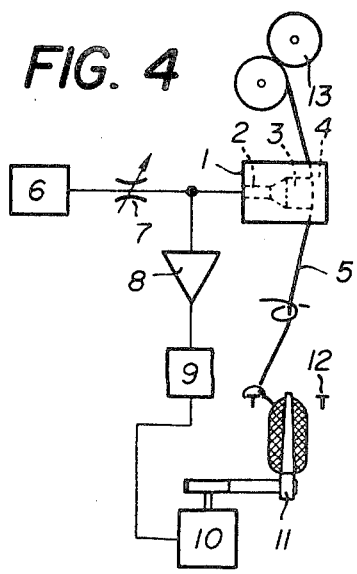
FIG. 4
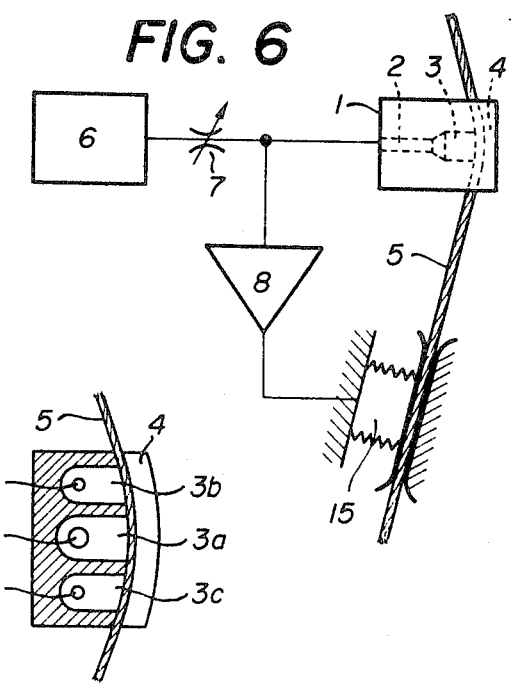
FIG. 6
FIG. 7

PROCESS AND APPARATUS FOR CONTINUOUSLY MEASURING THE VALUE OF THE TENSION IN A FILAMENT BEING DISPLACED FROM ONE POINT TO ANOTHER

FIELD OF THE INVENTION

The invention relates to methods and apparatus for continuously measuring the tension in a traveling filament.

BACKGROUND

The continuous measure of the tension in a filament while it is moving and particularly of a textile filament, is utilized to control a number of operations effected on the filament in the course of its manufacture, as well as at the time of its utilization.

This measure poses problems of wear resulting from the frictional contact of the filament on the surface of the support for measuring the pressure. There exist a number of solutions, certain ones utilizing a diversion system formed by three rollers of which the middle wheel is carried by an elastic arm whose deformation is measured. The most perfected arrangement is constituted by a sapphire surface connected to a piezo-electric pressure receiver. However, even a material as hard as sapphire cannot resist the resulting contact wear and it becomes deformed.

There also exists operations in the textile field, in the course of which it is desirable to measure the tension in the filament, but which are unfortunately incompatable with the contact of the filament against the surface of the support of the measuring device. This is notably the case for the measurement of the tension of a filament produced by a spinning device with a ring slider. In fact, on such devices the torsion is transferred to the filament by the rotation of the bobbin and of the slider on the ring and this torsion is transmitted to the drawing assembly which delivers the fibers which are then captured by the extremity of the filament during formation. Because of this fact, it is impossible to measure the tension of the filament between the ring slider and the drawing assembly without the contact of the filament on the surface of the measuring support preventing the torsion from communicating to the outlet of the drawing assembly.

SUMMARY OF THE INVENTION

An object of the present invention is to overcome the disadvantages mentioned above while permitting effectuation of the measurement of the tension of the filament without coming into contact therewith.

In this regard, the present invention has for its main object a process for continuously measuring the value of the tension of a filament being displaced from one point to another according to which a pressure is laterally exerted on the filament to displace it from its normal trajectory and the variation of the counter-pressure exerted by the filament is measured. The process is characterized in that to exert said pressure laterally, there is created between the said filament and a support, a flow of gas whose values of flow rate and pressure are chosen to form a film of gas between the filament and the support, and measuring variations of one of said values with respect to the corresponding value in the absence of the filament.

The invention is also directed to an apparatus for continuously measuring the value of the tension in a filament being displaced from one point to another comprising a measuring support provided with a groove for guidance of the filament, said groove being of triangular section and convex profile, a slot extending longitudinally at the bottom of said groove and having a width less than that of the filament to be measured, a source of fluid under pressure, a conduit connecting said source to said slot, and means for measuring one of the parameters of fluid flow in the interior of said conduit.

By choosing a sufficient flow rate of fluid, one can guarantee that the filament will not enter into contact with the measuring support.

The annexed drawing illustrates very schematically and by way of example, several embodiments of the apparatus according to the present invention.

BRIEF DESCRIPTION OF THE DRAWINGS

FIGS. 1 and 2 are respective sectional views taken along lines I — I in FIG. 2 and II — II in FIG. 1, illustrating the measurement support of the apparatus, FIG. 3 schematically represents the principle of the assembly of the apparatus, FIG. 4 illustrates a particular embodiment of the apparatus of FIG. 3, FIG. 5 illustrates another embodiment of this apparatus, FIG. 6 is a schematic illustration of a third embodiment, and FIG. 7 illustrates a variation of the support of FIGS. 1 and 2.

DETAILED DESCRIPTION

The measuring support 1 illustrated in FIGS. 1 and 2, is constituted by a flat element provided with a conduit 2 extending between its two side faces, which is terminated by a slot 3 extending to the bottom of a groove 4. As seen in FIG. 2 the groove is of triangular section while, as seen in FIG. 1, the groove has a convex profile. A filament 5 travels in groove 4, the tension of which filament is desired to be measured. The filament follows a bend in the groove such that the tension exerted on the filament is translated as the resultant of a pressure force urging the filament more or less intensely towards the bottom of the groove 4.

The conduit 2 of the measuring support 1 is connected, as shown in FIG. 3, to a source 6 of fluid under pressure, in this example air, through the intermediary of a variable resistance 7 such as a controllable orifice. An amplifier 8 is connected downstream of the resistance 7 to amplify the pressure prevailing in the conduit 2. The output of this amplifier 8 is connected to a member 9 adapted to utilize the information furnished by the amplifier 8. This member can be simply a measuring member constituted by a manometer or a flow meter whose dial face is graduated in order to indicate the value of the tension of the filament as a function of the pressure or the flow rate which is recorded. There can also be utilized a member for control of a brake of a motor, or to arrest a machine, while functioning thus as a detector of filament breakage.

The operation of the apparatus consists of feeding the conduit 2 with a flow rate of fluid, sufficient to overcome the pressure of the filament resulting from the tension exerted on the filament, in order that the pressure fluid, e.g. air, escapes around the filament and forms a pneumatic cushion on which the filament rests. If the tension of the filament varies within certain limits chosen to constantly maintain the cushion of air between the filament and the groove, the pressure in the conduit 2 varies proportiately.

In order to clearly disclose the practical possibilities of the system there will be given hereafter a numerical example, according to the following principle.

For a feed pressure Po of 1,000 mb, the flow Q is given by analogy with an electric circuit by the following formula:

$$U = RI$$

$$R = dp/Q$$

from which $$Q = dp/R$$

If the value of the variable resistance 7 is fixed at 100Ω, the resistance of the conduit to which the amplifier 8 is connected being practically infinite with respect to the variable resistance 7, and the resistance of the conduit 2 being negligable, there is obtained:

R = R7 + R4
R7 = variable resistance 7
R4 = resistance at the level of the groove 4

If the resistance R7 is fixed at 100Ω, the resistance R4 can vary from 0 to 100Ω, as a consequence the flow Q can in this case vary as follows:

$$Q = \frac{dp}{R} = \frac{1000}{100 \text{ to } 200} = 5 \text{ to } 10$$

The pressure P1 between the resistance R7 and the groove 4 can vary from 0 to 500 mb.

As has been mentioned previously, the principal advantage of this process for measuring the tension of a filament, resides in the fact that the measuring support is a true air bearing for the filament. This advantage resides in the fact there there is eliminated the wear of the measuring support and constitutes a solution whose cost is far less than the sapphire receivers associated with a piezo-electric element. In addition to the advantages, which are considerable, the process for measurement permits the measurement of the tension of a filament in the course of the processing of spinning in a device having a ring and a slider which would be incompatable previously with contact measurement due to the fact that the torsion applied to the filament by the ring and slider system would not have been able to be transmitted to the drawing assembly by reason of the contact with the measuring surface, thereby causing the breakage of the filament.

The application of the measuring process to a spinning device having a ring and slider is schematically illustrated in FIG. 4, in which there is again seen the measurement support 1 with its groove 4 of convex profile, the source 6 of pressure fluid, the variable resistance 7, the amplifier 8 and the member 9, which in this embodiment is connected to a motor 10 for driving a winding spindle 11 for the filament. The filament is produced by a conventional spinning device illustrated by a ring slider 12 producing a filament from fibers leaving a drawing or drafting means 13. The member 9 can be a member for transforming the fluid signal received from the amplifier 8 to an electrical signal or more simply, the member 9 can be a regulator member for the supply voltage for the motor 10 as a function of the tension of the filament, so as to vary the speed of the spindle 11 in order to maintain a constant tension between the drafting means 13 and the ring slider 12. Since a film of air is interposed between the filament and the groove 4 of measuring support 1, the torsion transmitted to the filament by the slider ring 12 can be propagated to the output of the drafting means 13 to twist the fibers leaving this drafting means at the extremity of the filament during formation.

The embodiment illustrated in FIG. 5 is adapted to regulate the tension of the filament from a supply means. As before, we see the different elements of the measuring apparatus designated by the same reference numerals, the member 9 being associated with a motor 14 which can either reduce or increase the tension T applied to the filament while it is traveling, by controllably applying braking force to the filament.

A pulley 14' of the motor, on which a loop of filament is wound, is disposed between a feed bobbin B and a machine (not shown) which pulls the filament at a certain constant or variable speed exerting a certain tension in the filament to overcome its resistance to leave the bobbin. By measuring the tension of the filament by means of the apparatus described hereinabove, the member 9 can vary the speed of the motor and reduce or even eliminate the variation of tension of the filament as well as fix the level of this tension to a desired value.

In a variation as shown in FIG. 6 it is possible to utilize the output signal of the amplifier 8 directly to activate a pneumatic brake 15.

Of course, the apparatus described can be utilized in other applications such as detector of breakage of the filament.

FIG. 7 illustrates a variation of the measuring support illustrated in FIGS. 1 and 2. In this variation, in addition to conduit 2a equivalent to the conduit of FIGS. 1 and 2, and which is terminated by a slot 3a, leading to a groove 4, two other slots 3b and 3c open into the groove 4 on opposite sides of the slot 3a. These slots 3b and 3c are connected to the source of fluid under pressue (not shown) by two conduits 2b and 2c respectively, so as to be separately fed from the conduit 2a, but at the same flow rate as the conduit 2a.

This arrangement assures that the filament can be applied over the entire length of the slot, without which the filament could contact the support at the inlet or the outlet of the slot, or the filament could allow escape of air by too rapidly leaving the support 1 precisely to avoid the risk of contact. In the first case, a frictional disturbance is added which is precisely what it is desired to avoid, while in the second case, the air pressure is reduced with respect to the actual tension of the filament and it gives a false measurement.

What is claimed is:

1. Apparatus for continuously measuring the value of the tension of the filament being displaced from one point to another, said apparatus comprising a measuring support provided with a groove for guiding a filament, said groove having a triangular section and being of convex profile, said support having a slot extending longitudinally and opening into said groove at the bottom thereof, said slot having a width less than that of the filament, a source of fluid under pressure, a conduit connecting said source to said slot such that fluid under pressure is discharged into said groove to form a fluid film cushion for travel of the filament, and means for measuring one of the flow parameters of the fluid at the interior of said conduit.

2. Apparatus as claimed in claim 1 wherein said support has two supplementary slots opening into the bottom of said groove on said opposite sides of the first said slot and having the same width thereas, and two separate conduits connecting said two supplementary slots to said source.

3. Apparatus as claimed in claim 2 wherein said slots are parallel.

4. Apparatus as claimed in claim 1 wherein said measuring means comprises a measuring instrument with means coupling the same to said conduit.

5. Apparatus as claimed in claim 1 comprising feed means for displacing the filament and establishing the tension therein, and means coupled to the measuring means for controlling the feed means to maintain a constant tension in the filament.

6. Apparatus as claimed in claim 5 wherein said feed means includes a brake means.

7. Apparatus as claimed in claim 5 wherein said feed means comprises a driving means.

8. Apparatus as claimed in claim 1 comprising a variable flow resistor between said source and said conduit.

9. A process for continuously measuring the tension of a filament being displaced from one point to another along a rectilinear trajectory, said method comprising directing a flow of gas normally to the filament to exert a lateral pressure on the filament to displace it from its trajectory, and measuring variation of counter-pressure exerted by the filament on the gas, the flow of gas being produced between the filament and a fixed support, the values of flow rate and pressure of the gas being such as to form a gas film between the filament and the support, said measuring step comprising comparing variation of one of said values with respect to the corresponding value recorded in the absence of the filament.

* * * * *